United States Patent Office 3,597,319
Patented Aug. 3, 1971

3,597,319
PROCESS FOR THE PRODUCTION OF HELLEBRIGENIN
Otto Isaac, Bruchkobel, Germany, assignor to Deutsche Gold- und Silber-Scheideanstalt vormals Roessler, Frankfurt am Main, Germany
No Drawing. Filed July 9, 1968, Ser. No. 743,298
Claims priority, application Germany, July 20, 1967, D 53,639
Int. Cl. C12d 13/00
U.S. Cl. 195—32                                          6 Claims

ABSTRACT OF THE DISCLOSURE

Hellebrigenin is produced from hellebrin or desglucohellebrin by treatment with a cellulase derived from *Aspergillus niger*, followed, if desired, by chromatographic purification.

BACKGROUND OF THE INVENTION

Hellebrigenin is the aglycon of the heart active glycoside hellebrin ($C_{35}H_{52}O_{15}$) belonging to the group of bufadienolides. Desglucohellebrin is produced when one mol of glucose is split from hellebrin and hellebrigenin is produced when in addition one mol of rhamnose is split off. Hellebrigenin, just as desglucohellebrin, has a strong heart action. The rapid onset of its action and its high peroral resorption quota render it especially advantageous and consequently there is a great therapeutic interest in the use of hellebrigenin as a medicine.

The difficulties encountered in the previous processes for its preparation, however, have stood in the way of its general use. Until now only the following two processes were available for its production.

According to the older process of J. Schmutz (Pharm. Acta Helv. 22, 373, 1947), hellebrin is first split into desglucohellebrin and glucose with Strophanthobiase and the desglucohellebrin then hydrolysed with concentrated HCl in acetone to hellebrigenin and rhamnose. The yield of hellebrigenin in this process, however, is not more than 5% with reference to the hellebrin content of the starting material.

The second process which is disclosed in DAS 1,176,794 also starts with hellebrin or hellebrin containing drug extracts. The cleavage in this instance is effected in one step with HCl in acetone. Nevertheless, the hellebrigenin yield is only 10–15% with reference to the hellebrin content of the starting material.

DESCRIPTION OF THE INVENTION INCLUDING PREFERRED EMBODIMENT

According to the invention hellebrigenin is produced by the treatment of hellebrin or desglucohellebrin or extracts or drugs containing the same with cellulase.

The success of such process is surprising as it is known, for example, that enzymes associated with heart glycosides always only split off the end sugar, namely, glucose, but in no instance attack the bond between the aglycon and the desoxy sugar (A. Stoll, J. Renz, Enzymologia 7, 362, 1939). Thus, in the well known process for the production of hellebrigenin, Strophanthobiase only leads to the desglucohellebrin and according to DAS 1,221,764 in the genuine heart glycoside, erysimoside, in which the sugar chain again is formed of a desoxy sugar and glucose, cellulase only again splits off the end glucose radical with the formation of desglucoerysimoside (Helveticoside). When erysimum-enzyme (Chemicke Zvesti XVI, 3 Bratislva 1962) or commercial β-glucosidase (applicant's experiments) were used on hellebrin again only desglucohellebrin was obtained.

The cleavage of hellebrin or desglucohellebrin according to the invention with cellulase renders it possible to produce hellebrigenin in a very simple and time saving manner practically without losses. Especially, the formation of 5,6-anhydrohellebrigenin, which is always obtained with the HCl treatment, is avoided. The yield of hellebrigenin on an average is 60–70% of theory. The conversion at, for example, 32° C. is almost ended in 24–48 hours.

It is important for the conversion according to the invention that a sufficient enzyme activity is provided. The presence of sufficient enzyme activity is expediently ascertained at the beginning, as well as during the progress of the cleavage by thin layer chromatography of samples. The enzyme concentration available for the hellebrin may be consumed by other cellulase consuming components which may be present in varying quantities in the starting material. In the event no cleavage of hellebrin occurs upon addition of a certain quantity of cellulase or it does not proceed satisfactorily it is only necessary to increase the quantity of cellulase. With a pure solution of 1 gram of hellebrin a quantity of cellulase between 1 and 10 grams has been found advantageous. Commercial cellulase from *Aspergillus niger* can, for example, be used with good success.

The enzyme treatment is expediently carried out at a temperature between about 20 and 50° C., preferably, between 30 and 40° C. The end of the cleavage is best ascertained by thin layer chromatography.

Either pure hellebrin or desglucohellebrin or extracts of hellebrin or desglucohellebrin purified in a usual manner or hellebrin or desglucohellebrin containing drugs prepared in a usual manner can be used as the starting material for the process according to the invention. The cleavage can be effected in solutions, in suspensions or in the form of a mash.

The hellebrigenin produced can be purified in a known manner, for example, by chromatographic purification, for instance, using silica gel. The purification, however, can be effected by other methods, for example, with the aid of ion exchangers.

The following example will serve to illustrate the process according to the invention.

EXAMPLE 1 g. of hellebrin was dissolved in 1000 ml. of water and 2 ml. of toluene and 5 g. of cellulase (from *Aspergillus niger*) added thereto and the mixture incubated for 24 hours at 32° C. The reaction mixture was extracted exhaustively with chloroform/methanol (99:1). The chloroform phase was dried over sodium sulfate and then boiled down.

The residue was then chromatographed on a column of silica gel and elutriated with chloroform/methanol (9:1). The hellebrigenin fractions were combined according to the thin layer chromatograph findings and evaporated to dryness. Yield 400 mg., (69% of theory).

Analogous results were obtained when the starting material hellebrin was replaced by desglucohellebrin.

I claim:
1. Process for the production of hellebrigenin which comprises subjecting a glycoside selected from the group consisting of hellebrin and desglucohellebrin to the enzymatic action of an effective amount of cellulase to effect cleavage of the sugar portion of the glycoside.

2. The process of claim 1 in which said cleavage is effected in an aqueous medium.

3. The process of claim 2 in which the treatment of the glycoside with the cellulase is effected at a temperature between 20 and 50° C.

4. The process of claim 2 in which the treatment of the glycoside with the cellulase is effected at a temperature between 30 and 40° C.

5. The process of claim 2 comprising in addition purifying the hellebrigenin produced by chromatography on silica gel.

6. The process of claim 1 wherein the cellulase is obtained from *Aspergillus niger*.

References Cited

UNITED STATES PATENTS 2,857,318  10/1958  Horowitz _____ 195—32

OTHER REFERENCES

Gvozdyak et al.: Chemical Abstracts, vol. 65, 1966, No. 4176.

A. LOUIS MONACELL, Primary Examiner

G. M. NATH, Assistant Examiner

U.S. Cl. X.R.

195—35